(12) United States Patent
Mitra et al.

(10) Patent No.: US 10,569,223 B2
(45) Date of Patent: Feb. 25, 2020

(54) SYSTEMS AND METHODS FOR MAXIMIZING RECOVERY IN MEMBRANE DISTILLATION

(71) Applicant: NEW JERSEY INSTITUTE OF TECHNOLOGY, Newark, NJ (US)

(72) Inventors: Somenath Mitra, Bridgewater, NJ (US); Sagar Roy, Newark, NJ (US)

(*) Notice: Subject to any disclaimer, the term of this patent is extended or adjusted under 35 U.S.C. 154(b) by 0 days.

(21) Appl. No.: 15/628,205

(22) Filed: Jun. 20, 2017

(65) Prior Publication Data
US 2017/0368506 A1 Dec. 28, 2017

Related U.S. Application Data

(60) Provisional application No. 62/353,787, filed on Jun. 23, 2016.

(51) Int. Cl.
*B01D 61/36* (2006.01)
*B01D 63/10* (2006.01)
(Continued)

(52) U.S. Cl.
CPC .......... *B01D 61/364* (2013.01); *B01D 61/58* (2013.01); *B01D 63/10* (2013.01); *C02F 1/447* (2013.01); *B01D 2311/103* (2013.01); *B01D 2317/02* (2013.01); *B01D 2317/022* (2013.01); *B01D 2317/04* (2013.01); *C02F 2103/08* (2013.01)

(58) Field of Classification Search
None
See application file for complete search history.

(56) References Cited

U.S. PATENT DOCUMENTS

| 6,716,355 B1 * | 4/2004 | Hanemaaijer | B01D 61/364 210/640 |
| 2010/0072135 A1 * | 3/2010 | Hanemaaijer | B01D 1/0035 210/640 |

(Continued)

FOREIGN PATENT DOCUMENTS

| CA | 2901579 A1 * | 9/2014 | C07C 29/16 |
| CN | 104190258 A * | 12/2014 | B01D 61/36 |
| WO | WO-2016041292 A1 * | 3/2016 | B01D 61/36 |

OTHER PUBLICATIONS

Entropy Generation of Desalination Powered by Variable Temperature Waste Hear Warsinger, David M. et al—entropy, 2015, 17, 7530-7566 (Year: 2015).*

(Continued)

*Primary Examiner* — Bradley R Spies
(74) *Attorney, Agent, or Firm* — Rajan Law Office, LLC; Rangarajan Sourirajan

(57) ABSTRACT

Membrane distillation (MD) systems include at least two MD modules arranged in series, each of at least two MD modules including a condensing media inlet operable to receive a condensing media and a condensing media outlet, a feed inlet operable to receive a feed media and a feed outlet, and a first heating element positioned and operable to heat a feed prior to or upon introduction of the feed to a first of the at least two MD modules, wherein a stream exiting the feed outlet of the first of the at least two MD modules is introduced to the second of the at least two MD modules. Other MD systems include at least two MD modules arranged in parallel.

16 Claims, 15 Drawing Sheets

(51) Int. Cl.
*C02F 1/44* (2006.01)
*C02F 103/08* (2006.01)
*B01D 61/58* (2006.01)

(56) References Cited

U.S. PATENT DOCUMENTS

2013/0206580 A1* 8/2013 Marburger ............. B01D 1/222
 203/41
2016/0002136 A1* 1/2016 Lueken .................. C07C 29/16
 568/882

OTHER PUBLICATIONS

WO 2016041292 Machine Translation—Espacenet machine translation—Wang Yue et al—Mar. 24, 2016 (Year: 2016).*
Gilron, Jack et al—"Design for Cascade of Crossflow Direct Contact Membrane Distillation"—Ind. Eng. Chem. Res., vol. 46, No. 8, 2007, 2324-2334 (Year: 2007).*

* cited by examiner

SYSTEMS AND METHODS FOR MAXIMIZING RECOVERY IN MEMBRANE DISTILLATION

CROSS-REFERENCE TO RELATED APPLICATIONS

This application claims the benefit of U.S. Provisional Patent Application No. 62/353,787 filed Jun. 23, 2016, the entirety of which is incorporated herein by reference.

FIELD OF THE INVENTION

This invention relates to membrane distillation and in particular to desalination systems and methods employing membrane distillation.

BACKGROUND OF THE INVENTION

As the shortage of clean water looms in the horizon, there is much interest in developing novel, cost effective desalination technology. Current methodologies include thermal, chemical and reverse osmosis. Membrane distillation (MD) has emerged as an alternative to address some of the issues related to the current technologies. MD is a membrane-based evaporation process in which the driving force is the temperature-induced vapor pressure difference caused by employing a hot feed and a cold permeate.

SUMMARY OF THE INVENTION

Embodiments disclosed herein include novel MD systems which may be used for desalination, and methods providing high water recovery and yield. MD is typically carried out at 60-90° C., which is significantly lower than conventional distillation processes. As a result, processes employing MD can potentially generate high quality drinking water using only low grade heat sources such as waste heat from industrial processes and solar energy. However, currently available MD desalination processes are characterized by low water recovery compared to other conventional systems. The systems and methods disclosed herein maximize solute rejection and flux, providing high water recovery from the feed. Though the presently disclosed subject matter has particular utility in desalination processes, the systems and methods disclosed herein may be employed in other applications.

In accordance with one or more embodiments MD systems disclosed herein include at least two membrane modules arranged in series. As with each of the systems disclosed herein, each of the MD modules may be selected from a hollow fiber membrane module, a flat membrane module and a spiral wound membrane module. The system may further include a heating element disposed between the membrane modules to heat feed exiting the first membrane module. In one or more embodiments an MD module may include at least one heating element positioned therein.

In one or more embodiments an MD system includes at least two MD modules arranged in series, each of at least two MD modules including a condensing media inlet operable to receive a condensing media and a condensing media outlet, a feed inlet operable to receive a feed media and a feed outlet, and a first heating element positioned and operable to heat a feed prior to or upon introduction of the feed to a first of the at least two MD modules, wherein a stream exiting the feed outlet of the first of the at least two MD modules is introduced to the second of the at least two MD modules. The system may include a second heating element positioned and operable to heat the stream exiting the first of the at least two MD modules.

The MD system may include more than two MD modules and plural heating elements in addition to the first heating element, wherein each of the plural heating elements is operable to heat a stream exiting each of the more than two MD modules prior to or upon the stream being introduced to a successive MD module.

In still a further embodiment multi-modular MD systems are disclosed having multiple membrane modules arranged in series and a central heating element positioned to heat a feed stream prior to the feed entering the first module, and to heat feed exiting each module prior to entering the next membrane module in series.

In further embodiments, MD systems are disclosed including at least two membrane modules arranged in parallel with a single heating element serving both feed streams entering the membrane modules.

In one or more embodiments an MD system includes at least two MD modules arranged in parallel, each of at least two MD modules including a condensing media inlet operable to receive a condensing media and a condensing media outlet, a feed inlet operable to receive a feed media and a feed outlet, and a first heating element positioned and operable to heat a feed stream prior to or upon introduction of the feed stream to each of the at least two MD modules.

The heating element may be a central heat exchanger positioned and operable to heat plural feed streams prior to the introduction of the plural feed streams to each of the at least two MD modules.

In further embodiments, methods are disclosed for purifying a feed stream, including the steps of providing a plurality of membrane modules arranged in series, heating a feed stream prior to or upon introduction of the feed to a first membrane module in the series, subsequently heating feed exiting the first membrane module prior to or upon introducing the feed to the second membrane module in the series, and heating the feed exiting the second and any subsequent plurality of membrane modules in the series prior to or upon introducing the feed to a subsequent membrane module.

In accordance with yet further embodiments herein, devices and methods are disclosed to maintain temperature uniformly in the feed side of a membrane module to maintain a high temperature gradient throughout the module, and enhance membrane flux.

In one embodiment an MD module which may be employed in the systems and methods disclosed herein includes at least one membrane, a feed inlet, a feed outlet, a condensing media inlet, a condensing media outlet and a heating element positioned in the MD module. The MD module may include at least one filler, such as but not limited to ceramic beads, silica, metal beads, metal oxide beads, graphite fibers and carbon black.

In another embodiment a spiral wound membrane module which may be employed in the systems and methods disclosed herein includes at least one membrane, hot a feed inlet, a hot feed outlet, a condensing media inlet, a condensing media outlet, a hot feed channel, a condensing media feed channel, at least one baffle positioned in the hot feed channel, and an external steam jacket. The membrane module may include at least one filler, such as but not limited to ceramic beads, silica, metal beads, metal oxide beads, graphite fibers and carbon black.

BRIEF DESCRIPTION OF THE DRAWINGS

For purposes of illustration, there are forms shown in the drawings that are presently preferred, it being understood, however, that the invention is not limited to the precise arrangements and instrumentalities shown.

DETAILED DESCRIPTION OF INVENTION

Figure 1:
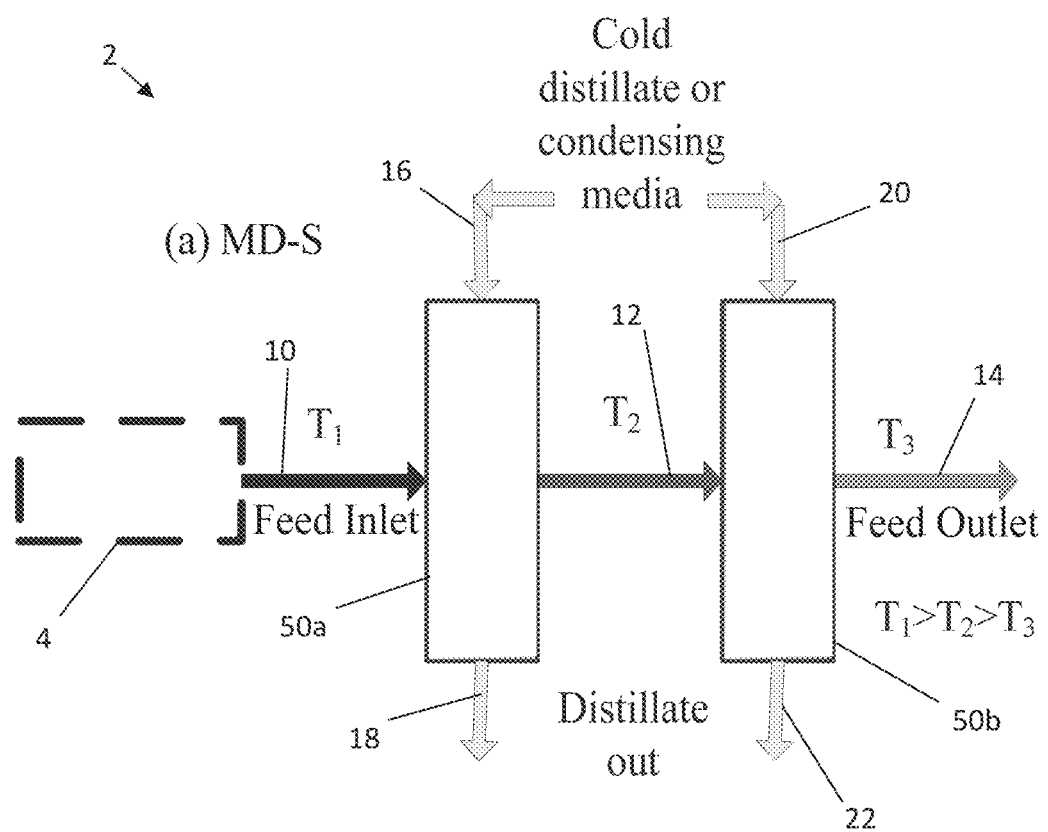
FIG. 1 is a schematic depiction of a membrane distillation (MD) system with two membrane modules in series in accordance with one or more embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Now referring to FIG. 1, in a first embodiment an MD system 2, referred to herein as MD-S, includes two membrane distillation modules 50a and 50b arranged in series and a heating element 4 operable to heat initial feed. The heating element 2 heats a feedstock to a temperature $T_1$ prior to introduction of feed stream 10 to the first MD module 50a. Stream 12 exiting the first MD module 50a is introduced to the second MD module 50b at a lower temperature ($T_2$) than that of feed stream 10. Stream 14 exiting MD module 50b does so at a still lower temperature ($T_3$). Cold distillate or condensing media streams 16 and 20 are circulated through MD modules 50a and 50b, respectively, exiting as streams 18 and 22, respectively.

The heating element 4 may be any suitable heating element known to those having ordinary skill in the art, including but not limited to a heat exchanger, etc.

Figure 1A:
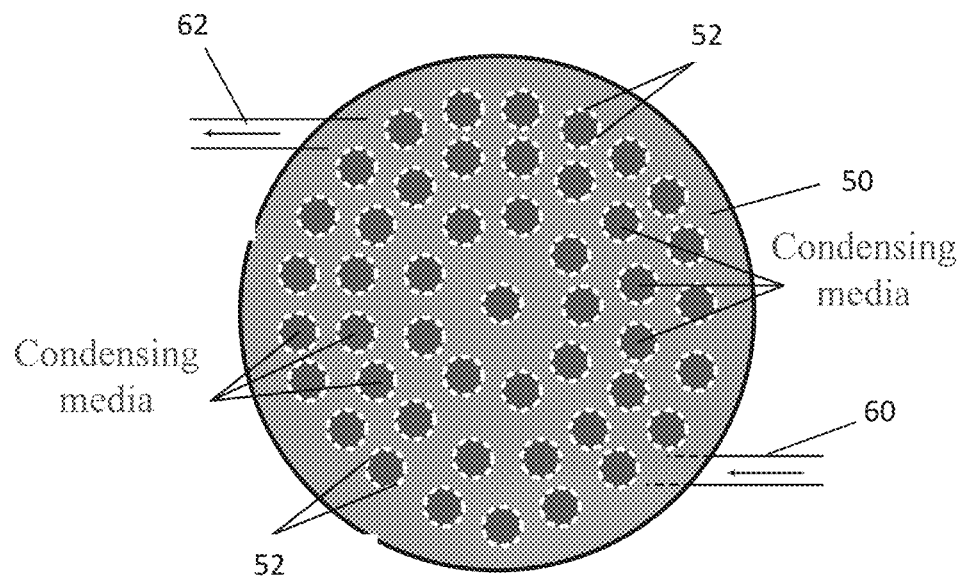
FIG. 1A is a cross-sectional view of a hollow fiber membrane module in accordance with one or more embodiments of the present invention.
Figure 1B:
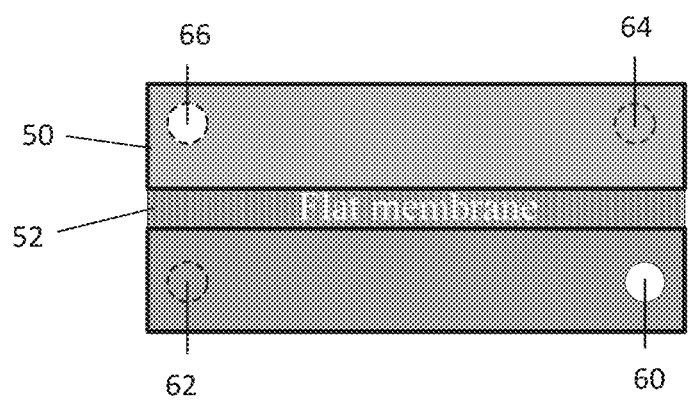
FIG. 1B is a cross-sectional view of a flat membrane module in accordance with one or more embodiments of the present invention.
Figure 1C:
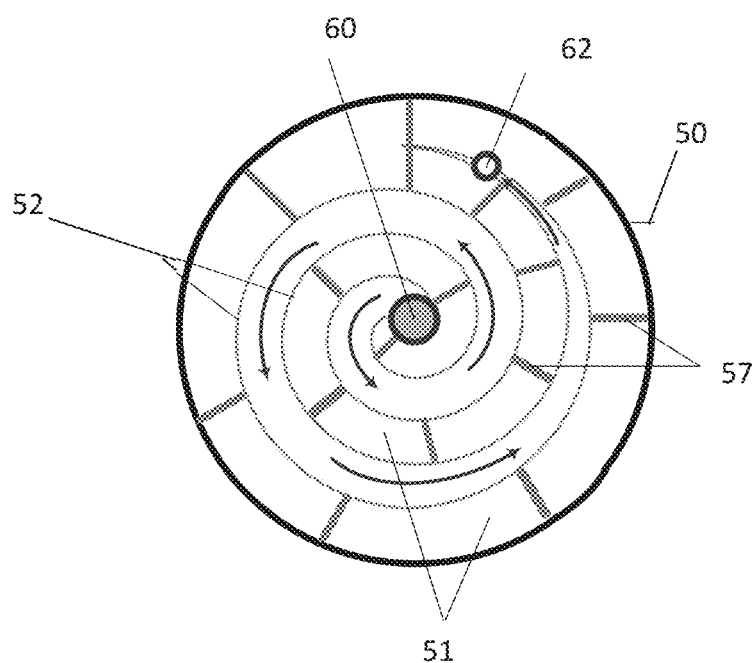
FIG. 1C is a cross-sectional view of a spiral wound membrane module in accordance with one or more embodiments of the present invention.

With further reference to FIGS. 1A-1C, each of the MD modules in the embodiment of FIG. 1 and all other embodiments disclosed herein may employ membranes such as but not limited to hollow fiber membranes, flat membranes, spiral wound membranes, etc.

With reference to FIG. 1A, a typical hollow fiber membrane module 50 in accordance with one or more embodiments of the present invention includes a plurality of hollow fiber membranes 52, a feed water inlet 60 and feed water outlet 62. Condensing media may be introduced to the membrane module 50 via an inlet (not shown) and flow through the bores of the membranes 52 and exit an outlet (not shown). Hollow fiber membranes may be formed of any suitable material such as but not limited to polypropylene. Suitable hollow fiber membrane modules are commercially available from Applied Membrane Technology (AMT), Hopkins, Minn. and Eclipse Membrane, Plymouth Meeting, Pa.

With reference to FIG. 1B, a typical flat membrane module 50 includes a flat membrane 52, a feed water inlet 60, feed water outlet 62, condensing media inlet 64 and condensing media outlet 66. Flat membranes may be formed of any suitable material such as but not limited to PTFE. Suitable flat membrane modules are commercially available from Memsys GmbH, Schwabmünchen, Germany.

With reference to FIG. 1C, a typical spiral wound membrane module 50 includes a spiral wound membrane 52, condensing media passage 51, spacers or baffles 57, a feed water inlet 60 and feed water outlet 62. Suitable spiral wound membrane modules are commercially available from SolarSpring GmbH, Freiburg, Germany.

Each of the MD modules may be any suitable MD module, such as but not limited to direct contact membrane distillation (DCMD) modules, sweep gas membrane distillation (SGMD) modules, vacuum membrane distillation (VMD) modules and/or air gap membrane distillation (AGMD) modules.

It will be apparent to those skilled in the art that feed media passages and condensing media passages of MD membrane modules may be used interchangeably in at least some applications and/or embodiments disclosed herein.

Figure 2:
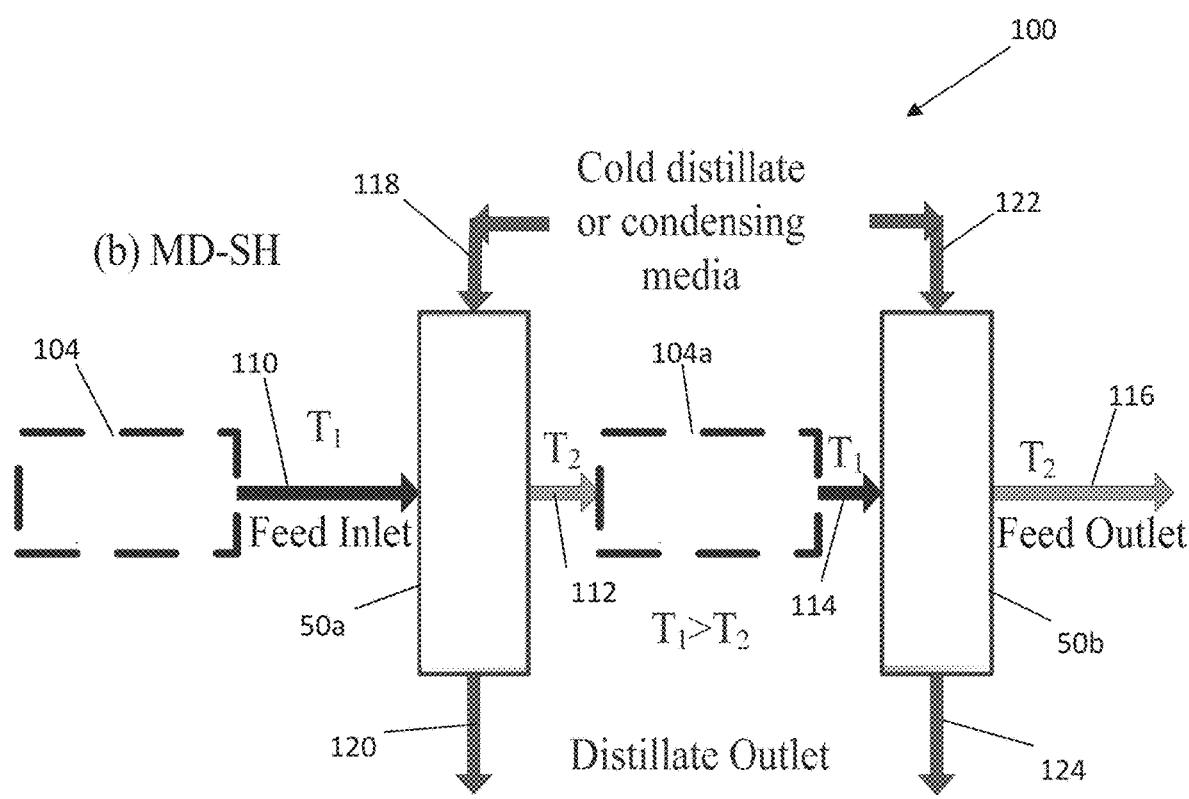
FIG. 2 is a schematic depiction of an MD system with two membrane modules in series with a first heating element positioned to heat feed entering the first membrane module and a second heating element disposed between the first and second membrane modules in accordance with one or more embodiments of the present invention.

Now referring to FIG. 2, in another embodiment an MD system 100 (referred to herein as MD-SH) includes two membrane distillation modules 50a and 50b arranged in series, a heating element 104 operable to heat initial feed and an additional heating element 104a. The heating element 104 heats a feedstock so that feed stream 110 at a temperature $T_1$ is introduced to the first MD module 50a. Stream 112 exits MD module 50a at a lower temperature ($T_2$) than that of feed stream 110 and is subjected to heating by heating element 104a. Stream 114, heated to a temperature $T_1$, is introduced to the second MD module 50b. Stream 116 exiting MD module 50b does so at a temperature $T_2$. Cold distillate or condensing media streams 118 and 122 are circulated through MD modules 50a and 50b, respectively, exiting as streams 120 and 124, respectively. In this embodiment, the stream entering MD module 50b does so at a higher temperature than is possible in the system of FIG. 1.

Figure 3:
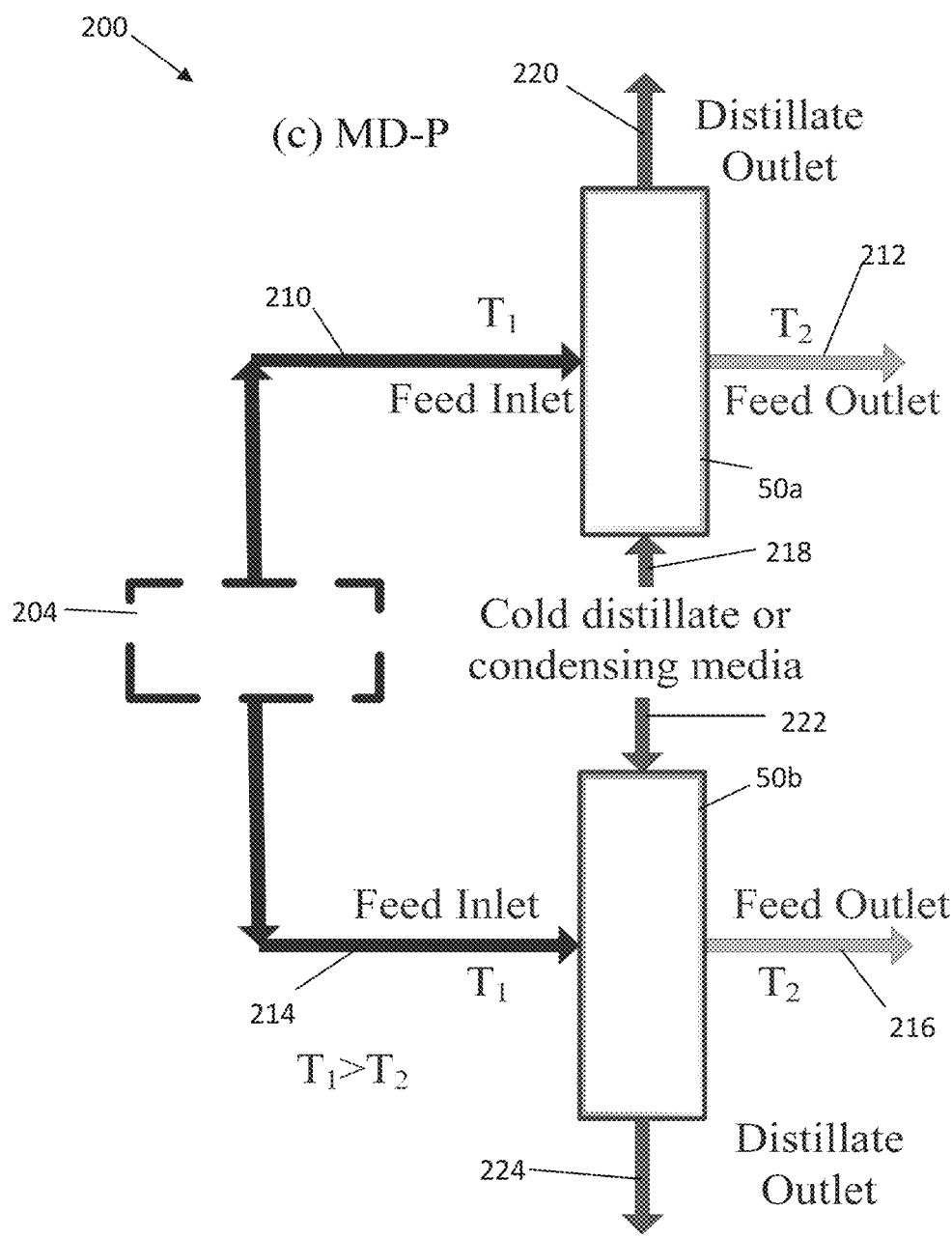
FIG. 3 is a schematic depiction of an MD system with two membrane modules in parallel with a single heating element serving both feed streams in accordance with one or more embodiments of the present invention.

Now referring to FIG. 3, in another embodiment an MD system 200 (referred to herein as MD-P) includes MD modules 50a, 50b arranged in parallel with a single heating element 204 heating feed prior to introduction to each of the MD modules 50a, 50b. Feedstock is heated in heating element 204 and heated streams 210 and 214 are introduced at temperature $T_1$ to MD modules 50a, 50b, respectively. Streams 212 and 216 exit MD modules 50a, 50b, respectively, at a temperature $T_2$ lower than $T_1$. The cold distillate water side arrangement employs parallel entry of the distillate streams 218 and 222 into MD modules 50a and 50b, respectively with distillate streams 220 and 224 exiting 50a and 50b, respectively.

Experiments were conducted using the systems of FIGS. 1-3.

Experiments—FIGS. 1-3

Materials.

Polypropylene hollow fiber membrane module as well as flat sheet PTFE membrane module was used in MD modules. Celgard X-20 PP hollow fibers and PTFE flat membrane from Advantec were used for this study. The effective membrane area for the hollow fiber modules and the flat sheet membranes were 188 cm$^2$ and 14.4 cm$^2$, respectively. The results were obtained using systems employing DCMD modules, but it is expected similar results would be obtained using other MD modules such as AGMD, VMD and/or SGMD modules.

Figure 4A:
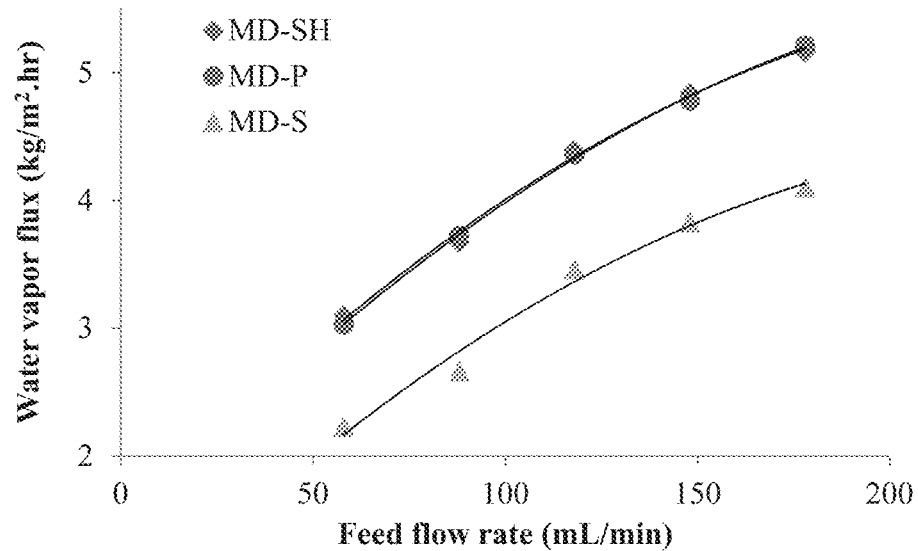
FIG. 4A is a graphical depiction of the variation of water vapor flux at different flow rates for the systems of FIGS. 1-3 employing polypropylene hollow fiber modules in accordance with one or more embodiments of the present invention.
Figure 4B:
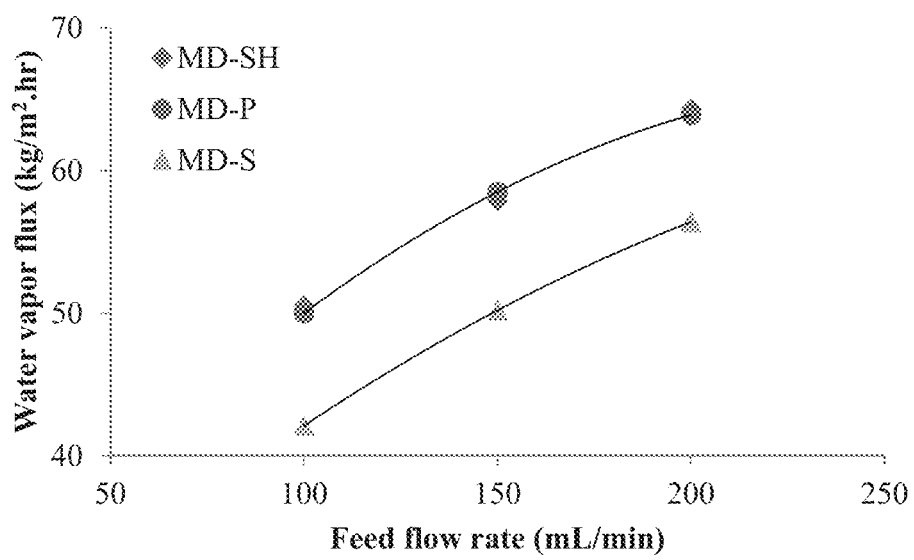
FIG. 4B a graphical depiction of the variation of water vapor flux at different flow rates for the systems of FIGS. 1-3 employing PTFE flat membrane modules in accordance with one or more embodiments of the present invention.

Now referring to FIGS. 4A-4B, water vapor flux was measured as a function of feed flow rate for module configurations with polypropylene hollow fiber modules (FIG. 4A) and PTFE flat membrane modules (FIG. 4B). For these experiments the hot brine temperature was kept at 80° C. FIGS. 4A-4B show that the water vapor flux was much lower for the system of FIG. 1 (modules in series without any heating of brine between modules (MD-S)) in comparison with the systems of FIG. 2 (MD-SH) and FIG. 3 (MD-P). The overall water vapor flux for the systems of FIGS. 2 (MD-SH) and 3 (MD-P) is similar. FIGS. 2 (MD-SH) and 3 (MD-P) reflect an enhancement in water vapor flux as high as 38% and 20% in comparison with the system of FIG. 1 (MD-S). The overall flux increased with an increase in flow rate. Since inlet flow rates were the same for each system, the total flow rate in MD-P was double that of the MD-S and MD-SH systems (FIGS. 1 and 2, respectively).

Properties of systems having module configurations MD-S, MD-SH and MD-P (corresponding to FIGS. 1, 2, and 3, respectively) were compared. In one comparison each of the systems employed two (2) polypropylene hollow fiber modules at a feed flow rate of 88 mL/min and 80° C. feed inlet temperature. The permeate side flow rate was 80 mL/min at 20° C. Results are shown in Table 1A.

TABLE 1A

| Properties | Series - without heating (MD-S) | Series - with heating (MD-SH) | Parallel (MD-P) |
| --- | --- | --- | --- |
| Water vapor flux (kg/m$^2$ · hr) | 2.66 | 3.67 (~38% higher) | 3.72 (~38% higher) |
| Recovery from feed (%) | 1.89 | 2.61 | 1.33 |
| Heat required for module-1 (W) | 121 | 121 | 121 |
| Heat required for module-2 (W) | 75 | 121 | 121 |
| Total Heat Required (W) | 196 | 242 (23.5%) | 242 (23.5%) |
| Overall mass transfer coefficient (kg/m$^2$ · s · mmhg) | 4.38E−06 | 6.04E−06 (38% higher) | 6.13E−06 |

Table 1A shows the overall flux was enhanced by 38% in MD-SH and MD-P, but these systems also used an additional 23.5% supplied heat. This is attributed to the fact that at low temperature, the latent heat (or vapor pressure) of evaporation for water is much higher, hence required more energy to evaporate. Although the MD-SH and MD-P systems seem similar in water vapor flux and heat requirement, surprisingly the water recovery is much higher, i.e., almost double for the MD-SH system, in comparison with the MD-P system. The overall water vapor flux was very low as the feed flow rate was kept low to maintain a large difference between the inlet and outlet feed temperatures.

In another comparison, systems were compared in which each of the systems employed two (2) PTFE flat membrane modules at 100 mL/min feed flow rate and 80° C. feed inlet temperature. The permeate side flow rate was 100 mL/min at 20° C. The results appear in Table 1B.

TABLE 1B

| Properties | Series - without heating (MD-S) | Series - with heating (MD-SH) | Parallel (MD-P) |
| --- | --- | --- | --- |
| Water vapor flux (kg/m$^2$ · hr) | 42.1 | 50.5 (20% higher) | 50 (20% higher) |
| Recovery from feed (%/m$^2$ area) | 2.04 | 2.44 | 1.21 |
| Heat required for module-1 (W) | 67 | 67 | 67 |
| Heat required for module-2 (W) | 53 | 67 | 67 |
| Total Heat Required (W) | 120 | 134 (11.6% higher) | 134 (11.6% higher) |
| Overall mass transfer coefficient (kg/m$^2$ · s · mmhg) | 6.93E−05 | 8.31E−05 (20% higher) | 8.23E−05 |

The overall flux was enhanced up to 20% with only an additional 11.6% heat supplied. The data reveal the properties of the systems are similar to those reflected in Table 1A.

Figure 5A:
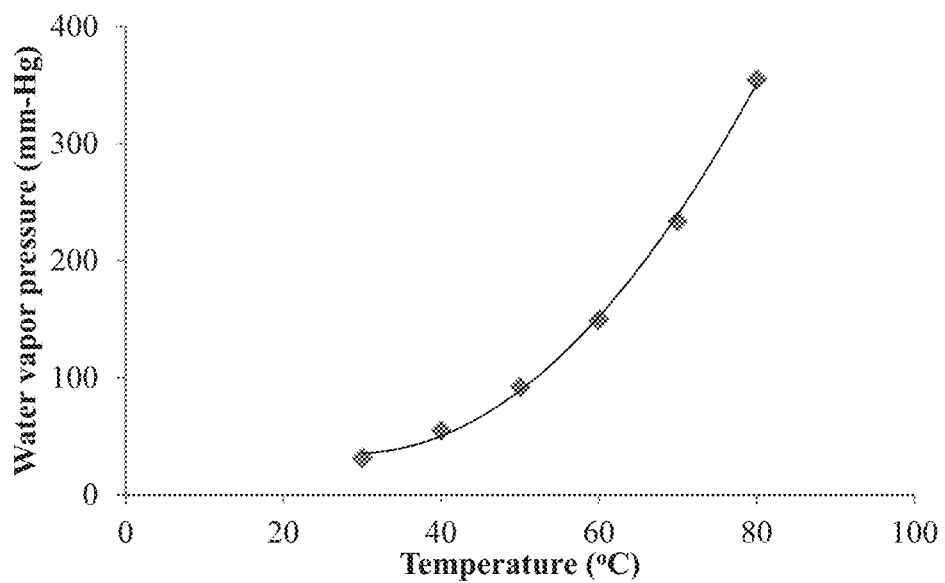
FIG. 5A is a graphical depiction of a vapor pressure curve of water at different temperatures in accordance with one or more embodiments of the present invention.
Figure 5B:
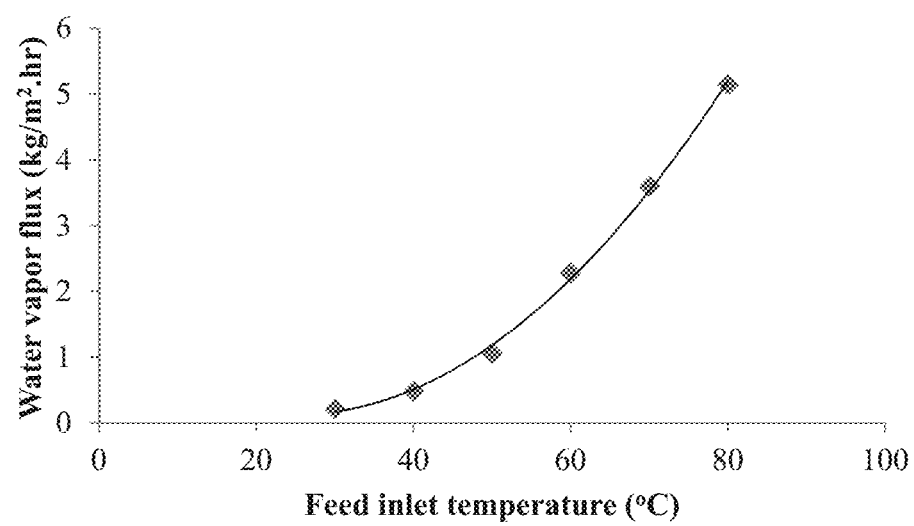
FIG. 5B is a graphical depiction of water vapor flux for a polypropylene hollow membrane in accordance with one or more embodiments of the present invention.
Figure 5C:
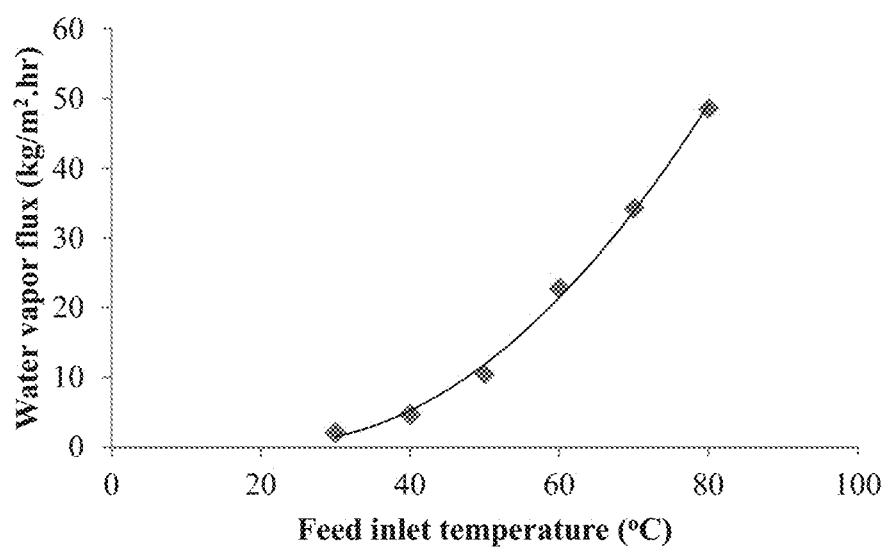
FIG. 5C is a graphical depiction of water vapor flux for a PTFE flat membrane in accordance with one or more embodiments of the present invention.

With reference to FIGS. 5A-5C, the water vapor flux for different types of membranes (e.g., polypropylene hollow fiber (FIG. 5B) and PTFE flat membrane (FIG. 5C) at various temperatures was revealed to follow a similar trend which resembles water vapor pressure at different temperatures (FIG. 5A). The water vapor flux increases with the increase in temperatures and the latent heat of vaporization for water is also smaller at higher temperatures. It is thus always beneficial to continue the MD operation at higher temperatures. Lowering the feed temperature also reduces the temperature gradient, hence the driving force for the MD. Increasing the number of modules in series without heating does not produce the water vapor flux efficiently, as temperature is lost throughout the process (as well as productivity).

Enhanced Water Recovery with Increased Number of Modules

Figure 6:
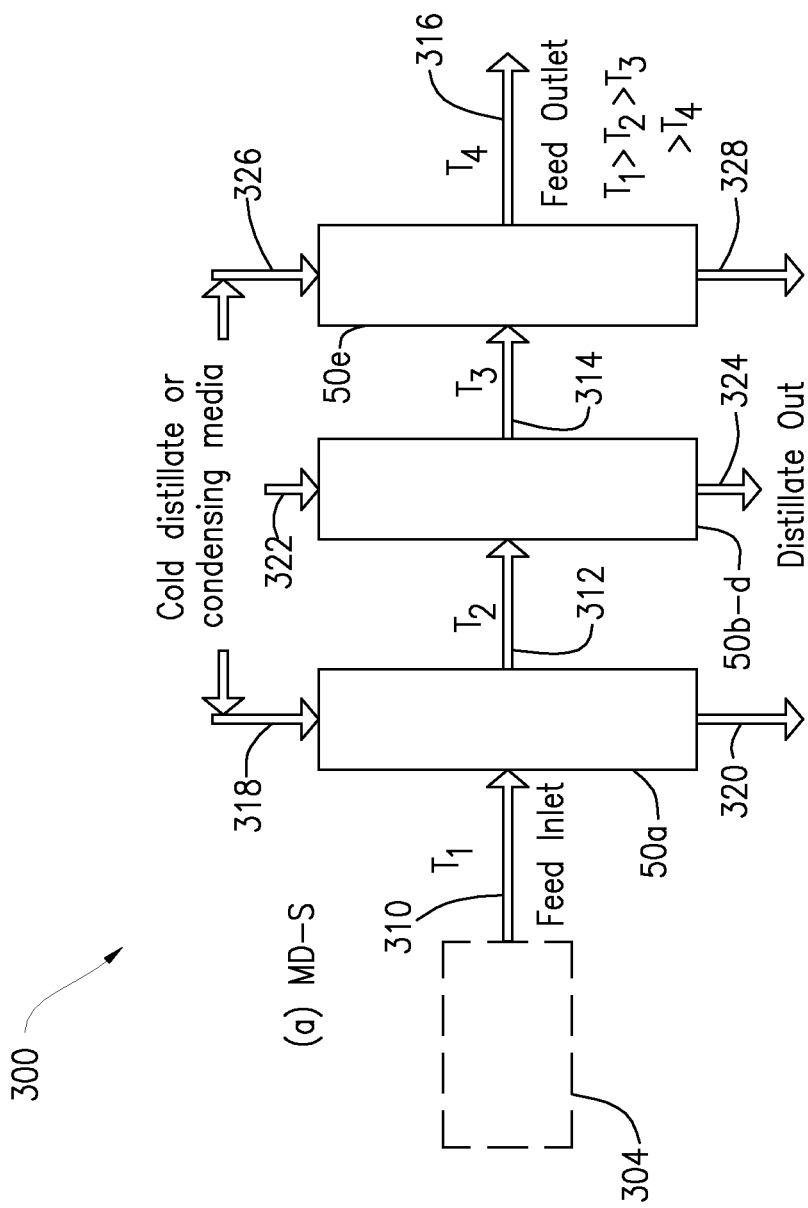
FIG. 6 is a schematic depiction of an MD system with five membrane modules arranged in series in accordance with one or more embodiments of the present invention.
Figure 7:
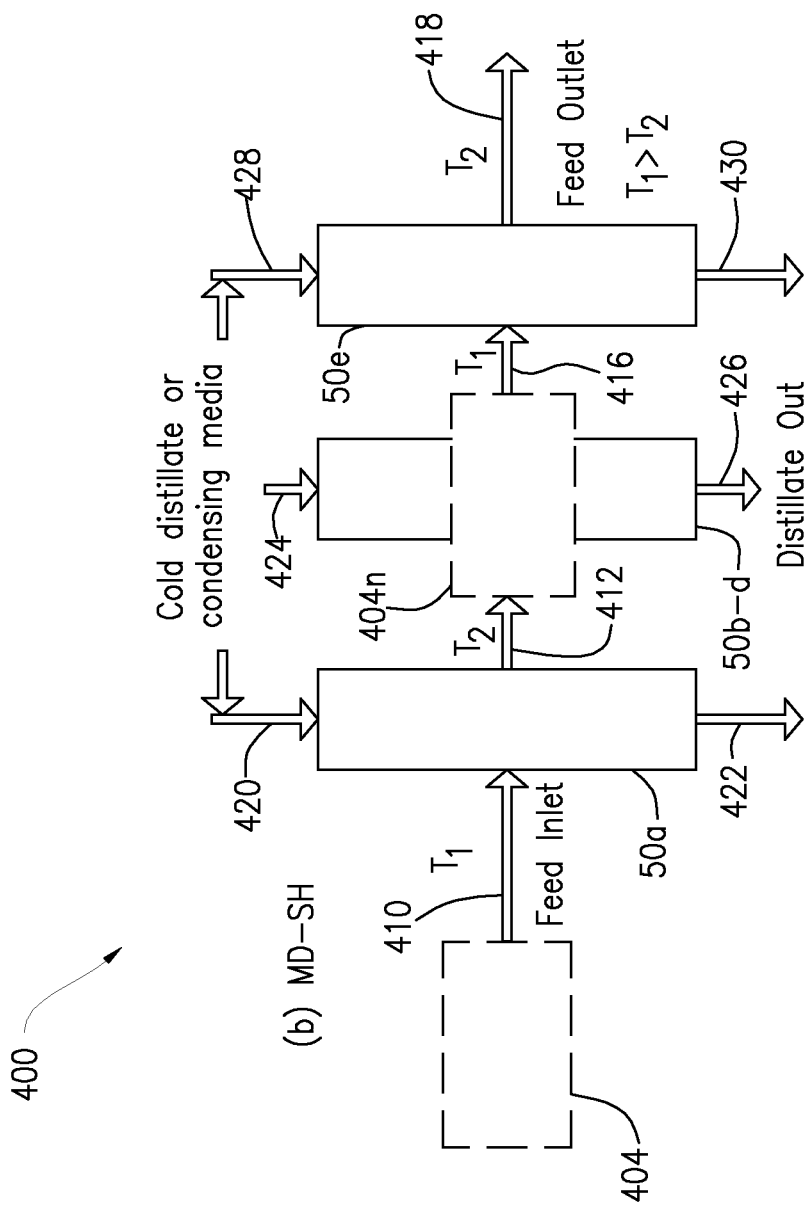
FIG. 7 is a schematic depiction of an MD system with five membranes arranged in series with a heating element positioned to heat feed entering the first membrane module in the series and at least one heating element disposed between each of the modules in accordance with one or more embodiments of the present invention.
Figure 8:
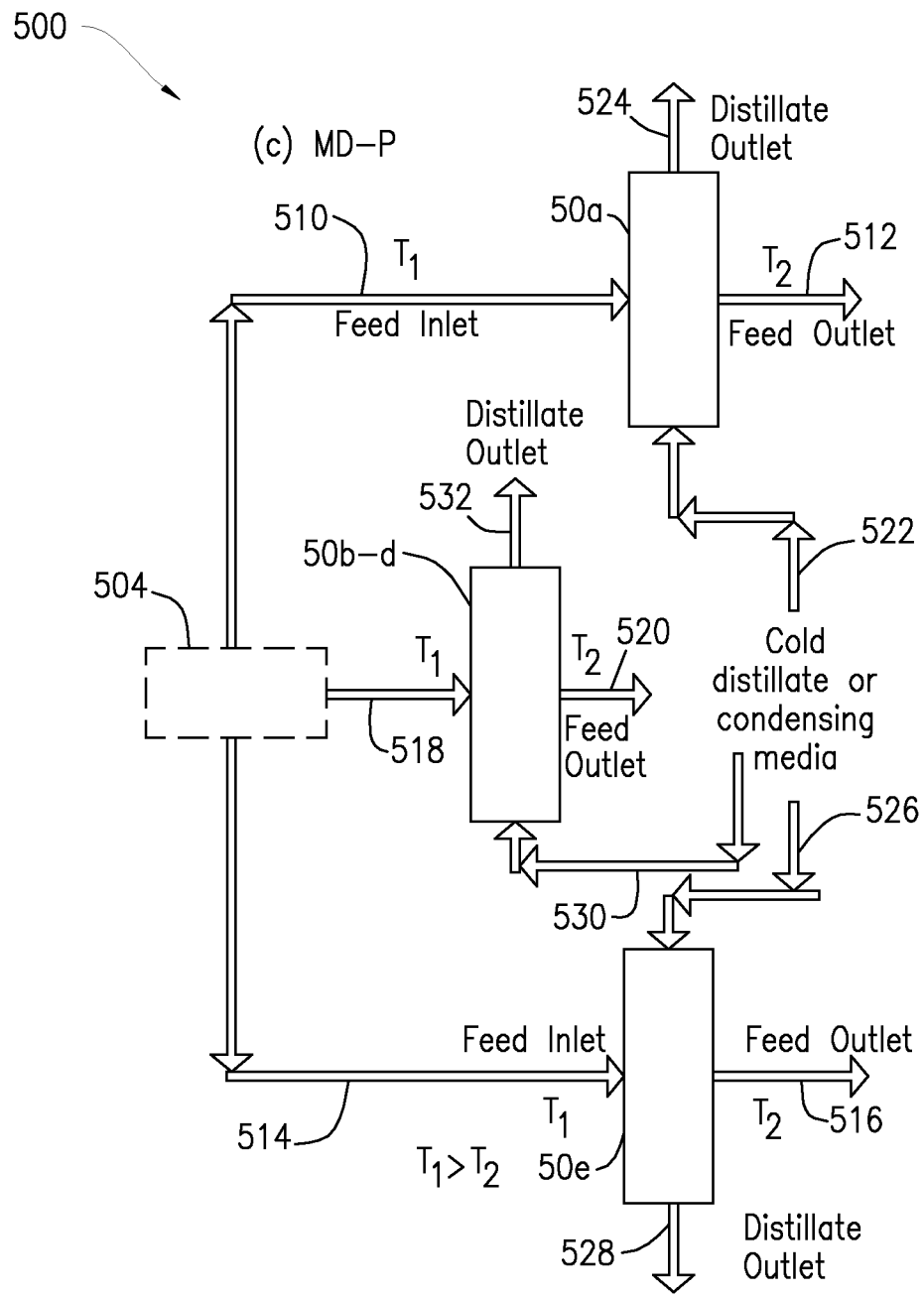
FIG. 8 is a schematic depiction of an MD system with five membranes arranged in parallel with a single heating element positioned to heat all feed streams in accordance with one or more embodiments of the present invention.

Now referring to FIGS. 6-8, embodiments are disclosed of systems with additional MD modules. With reference to FIG. 6, system 300 is a modification of the MD-S system of FIG. 1 and includes an additional three MD modules 50*b*, 50*c* and 50*d* (designated 50*b-d*) in series. A heating element 304 is positioned to heat feedstock so that heated feed stream 310 enters the first MD module 50*a*. Stream 312 is introduced to MD modules 50*b*-50*d* at T$_2$. Stream 314 exits MD modules 50*b*-50*d* at T$_3$ and is introduced to MD module 50*e*. Stream 316 exits MD module 50*e* at T$_4$. Cold distillate or condensing media streams 318, 322 and 326 are circulated through MD modules 50*a-e*, respectively, exiting as streams 320, 324 and 328, respectively. As will be apparent to the skilled artisan, media stream 322 is split into plural streams to circulate through each of MD modules 50*b-d*, and stream 324 represents streams exiting each of these modules. It will be apparent to the skilled artisan that while the embodiment shown includes three additional MD modules 50*b-d*, the number of MD modules represented by 50*b-d* may be greater than or less than three, and the appropriate number of condensing or cold distillate streams may be employed to accommodate each of the MD modules.

Now referring to FIG. 7, system 400 is a modification of the MD-SH system of FIG. 2 and includes an additional three modules 50*b-d* in series and heating elements 404*n* positioned between each of MD modules 50*a-e*. A heating element 404 is positioned to heat feedstock so that heated feed stream 410 enters the first MD module 50*a*. Stream 412 exits MD module 50*a* at T2 and is heated to T1 using a heating element 404*n* before entering each of serially-arranged MD modules 50*b*-50*d*, wherein n represents the number of heating elements positioned between each of MD modules 50*a-e*. In the exemplary embodiment n=4. A stream enters each of MD modules 50*b*-50*d* at T1 and upon exit at T2 is heated so that it enters the next MD module in series at T1. Thus, stream 416 exits the penultimate MD module 50*d* and is heated to T1 and is introduced to MD module 50*e*, and stream 418 exits MD module 50*e* at T2. Cold distillate or condensing media streams 420, 424 and 428 are circulated through MD modules 50*a-e*, respectively, exiting as streams 422, 426 and 430, respectively. As will be apparent to the skilled artisan, media stream 424 is split into plural streams to circulate through each of MD modules 50*b-d*, and stream 426 represents streams exiting each of these modules. It will be apparent to the skilled artisan that while the embodiment shown includes three additional MD modules 50*b-d*, the number of modules may be greater than or less than three, the appropriate number of condensing or cold distillate streams may be employed to accommodate each of the MD modules, and the number of heating elements n may be adjusted to include a heating element between each of the MD modules.

Now referring to FIG. 8, system 500 is a modification of the MD-P system of FIG. 3 with an additional three MD modules 50*b-d*, in which the feed to the three additional membrane modules is heated as described above with reference to FIG. 3. MD modules 50b-d are arranged in series. System 500 includes MD modules 50a, 50b-d and 50e arranged in parallel with a single heating element 504 heating feed prior to introduction to each of the MD modules 50a, 50b-d, and 50e. Feedstock is heated in heating element 504 and heated streams 510 and 514 and 518 are introduced at temperature $T_1$ to MD modules 50a, 50e and 50b-d respectively. Streams 512, 516 and 520 exit MD modules 50a, 50e and the penultimate MD module of 50b-d, respectively, at a temperature $T_2$ which is lower than $T_1$. The cold distillate water side arrangement employs parallel entry of the cold distillate or condensing media streams 522, 526 and 530 into MD modules 50a, 50e and 50b-d, respectively, with streams 524, 528 and 532 exiting MD modules 50a, 50e, and 50b-d, respectively. As will be apparent to the skilled artisan, media stream 530 is split into plural streams to circulate through each of MD modules 50b-d, and stream 532 represents streams exiting each of these modules. It will be apparent to the skilled artisan that while the embodiment shown includes three additional MD modules 50b-d, the number of modules may be greater than or less than three, and the appropriate number of condensing or cold distillate streams may be employed to accommodate each of the MD modules.

Experiments—FIGS. 6-8

Experiments were conducted using five polypropylene hollow fiber membrane modules for each system of FIGS. 6-8 and five PTFE flat sheet membrane modules for each of the systems of FIGS. 6-8. A feed flow rate of 88 mL/min was used for the hollow fiber membrane module systems and a feed flow rate of 100 mL/min was used for the flat sheet membrane module systems. For all experiments the feed inlet temperature was 80° C. and the permeate side flow rate was 80-100 mL/min at 20° C.

TABLE 2

| Properties | Series - without heating (MD-S) | Series - with heating (MD-SH) | Parallel (MD-P) |
|---|---|---|---|
| PP Hollow fiber membrane module | | | |
| Water vapor flux (kg/m² · hr) | 1.3 | 3.63 (~179% higher) | 3.63 (~179% higher) |
| Recovery from feed (%) | 2.31 | 6.47 | 1.29 |
| Total Heat Required (W) | 305.4 | 596.1 (95.2% higher) | 393.3 (28.8% higher) |
| PTFE membrane module | | | |
| Water vapor flux (kg/m² · hr) | 26.1 | 49.5 (90% higher) | 49.7 (90% higher) |
| Recovery from feed (%/) | 3.15 | 5.98 | 1.19 |
| Total Heat Required (W) | 221.4 | 333.5 (50.6% higher) | 333.5 (50.6% higher) |

Experiments were conducted using five polypropylene hollow fiber membrane modules for each system of FIGS. 6-8 and five PTFE flat sheet membrane modules for each of the systems of FIGS. 6-8. A feed flow rate of 88 mL/min was used for the hollow fiber membrane module systems and a feed flow rate of 100 mL/min was used for the flat sheet membrane module systems. For all experiments the feed inlet temperature was 80° C. and the permeate side flow rate was 80-100 mL/min at 20° C.

Table 2 shows the overall flux was enhanced up to 90-179% with an additional 50.6-95.2% extra supplied heat. Thus it is clear that an increased number of modules in series with a heating element positioned between the modules not only increased the overall flux but also increases the water recovery from the feed significantly, achieving a major advantage of this approach.

Membrane Area in Single Module

In MD, the latent heat of evaporation for water vapor is supplied by the hot feed circulated through the module. For a feed flow of 100 mL/min, the maximum available heat, for a temperature difference 60° C. (inlet water temperature: 80° C.; and outlet water temperature: 20° C.) is ~20 kJ (per minute basis and 80% efficiency).

$$\text{Maximum heat available from feed} = m \times C_p \times dT = \quad (1)$$
$$0.1 \times 4.19 \times 60 = 25.14 \ kJ/\text{min} = 20.1 \ kJ/\text{min}(80\% \text{ efficiency})$$
$$\text{Latent heat of vaporization} = 2310 \ kJ/\text{kg}$$
$$\text{Amount of water vapor} = 20.1/2310 \ \text{kg/min} = 0.008 \ \text{kg/min}$$

This heat is only enough to evaporate 8.7 mL/min water or 8.7% of feed. Considering a feed flow rate ~5 L/min, a maximum 435 mL/min theoretical water vapor flux from feed water is possible. For a membrane with 25 kg/m2·hr flux, the required membrane area to generate this flux should be no more than 1.05 m² area. Any membrane area over this limit is essentially a waste of space and money. Table 3 represents the membrane area as a function of feed flow rate.

TABLE 3

Membrane area as a function of feed flow rate

| Feed flow rate (L/min) | Available heat (kJ/min) | Water collected (L/min) | Optimum membrane area (m²) |
|---|---|---|---|
| 1 | 201.1 | 0.087 | 0.21 |
| 5 | 1005.6 | 0.435 | 1.04 |
| 10 | 2011.2 | 0.871 | 2.09 |
| 15 | 3016.8 | 1.306 | 3.13 |
| 20 | 4022.4 | 1.741 | 4.18 |
| 30 | 6033.6 | 2.612 | 6.27 |

Simulation in Multi-Modular Systems

Example 1

Figure 9A:
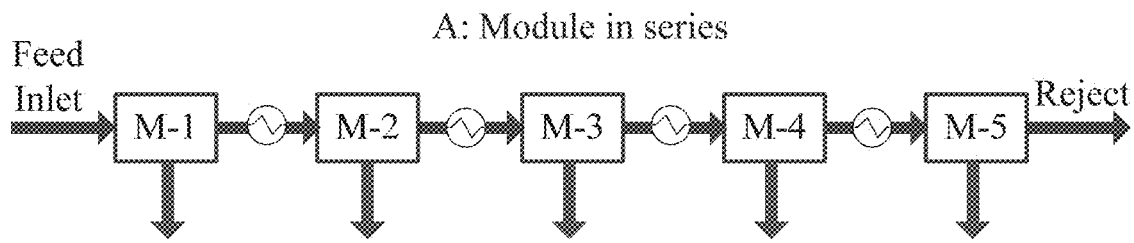
FIG. 9A is a schematic depiction of an MD system with multiple membrane modules arranged in series in accordance with one or more embodiments of the present invention.
Figure 9B:
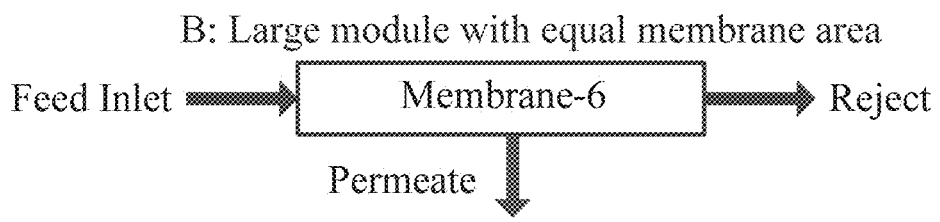
FIG. 9B is a schematic depiction of an MD system with a single large membrane module in accordance with one or more embodiments of the present invention.
Figure 9C:
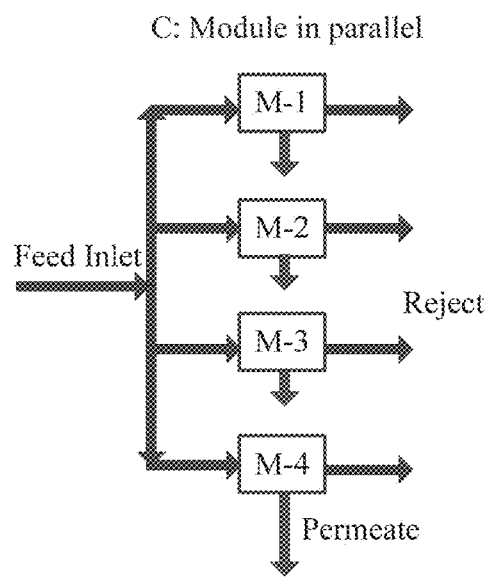
FIG. 9C is a schematic depiction of an MD system with multiple membrane modules arranged in parallel in accordance with one or more embodiments of the present invention.

Now referring to FIGS. 9A-9C, the overall water recovery from a typical feed flow rate of 5 L/min was simulated. In FIG. 9A five small membrane modules M-1 through M-5 were arranged in series. Hollow fiber membrane modules were used for the experiments. However, the simulation is also useful for the modules of other configurations, such as flat sheet or spiral wound modules. In FIG. 9B a single large membrane module was deployed having a surface area equal to the cumulative surface area of the five smaller modules of the system of FIG. 9B. In FIG. 9C, four membrane modules M-1 through M-4 were arranged in parallel, the cumulative membrane surface area being comparable to that of the systems of FIGS. 9A and 9B. The flux was considered as 25 kg/m²·hr, and the feed inlet temperature was 80° C. at 10000 ppm concentration. Performance data of the membranes in each system are tabulated in Table 4. The data in Table 4 make clear that for a particular flow rate the water recovery is highest for the modules in series and the value is ~320% higher than that of the large module or modules in parallel.

TABLE 4

Performance data with multi-modular systems and comparison with single module

| Membrane | Membrane area (m²) | Feed inlet (kg/min) | Water collected (kg/min) | Water recovery (%) | Heat required (kW) | Feed outlet concentration (ppm) |
|---|---|---|---|---|---|---|
| A: Small modules as MD-SH | 4.39 | 5 | 1.83 | 36.6 | 88.08 | 15769 |
| B: Large module | 4.39 | 5 | 0.43 | 8.7 | 20.95 | 10949 |
| C: Module in parallel | 4.16 | 20 | 1.72 | 8.7 | 83.8 | 10949 |

Multimodular System with Central Heat Exchanger

In MD, the vapor pressure gradient between the feed side and the permeate side provides the driving force for water vapor permeation. The, higher the temperature gradient, the higher the water vapor flux.

Figure 10:
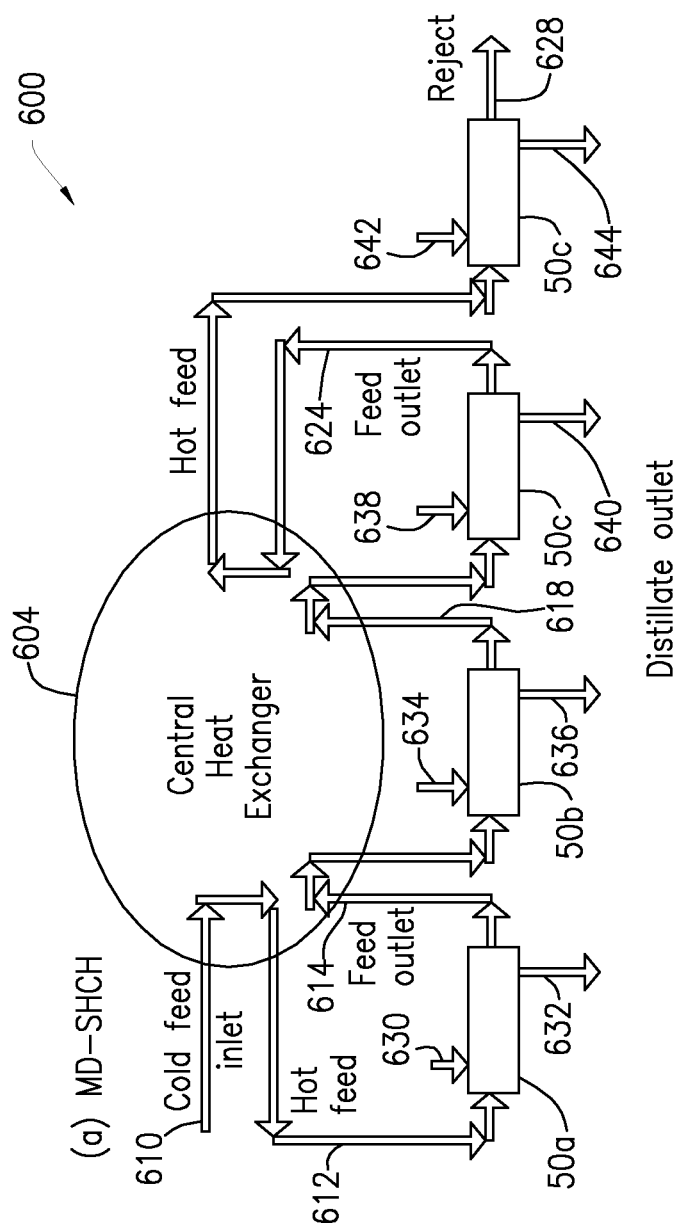
FIG. 10 is a schematic depiction of a multi-modular MD system with membrane modules arranged in series and a central heat exchanger (MD-SHCH) in accordance with one or more embodiments of the present invention.
Figure 11:
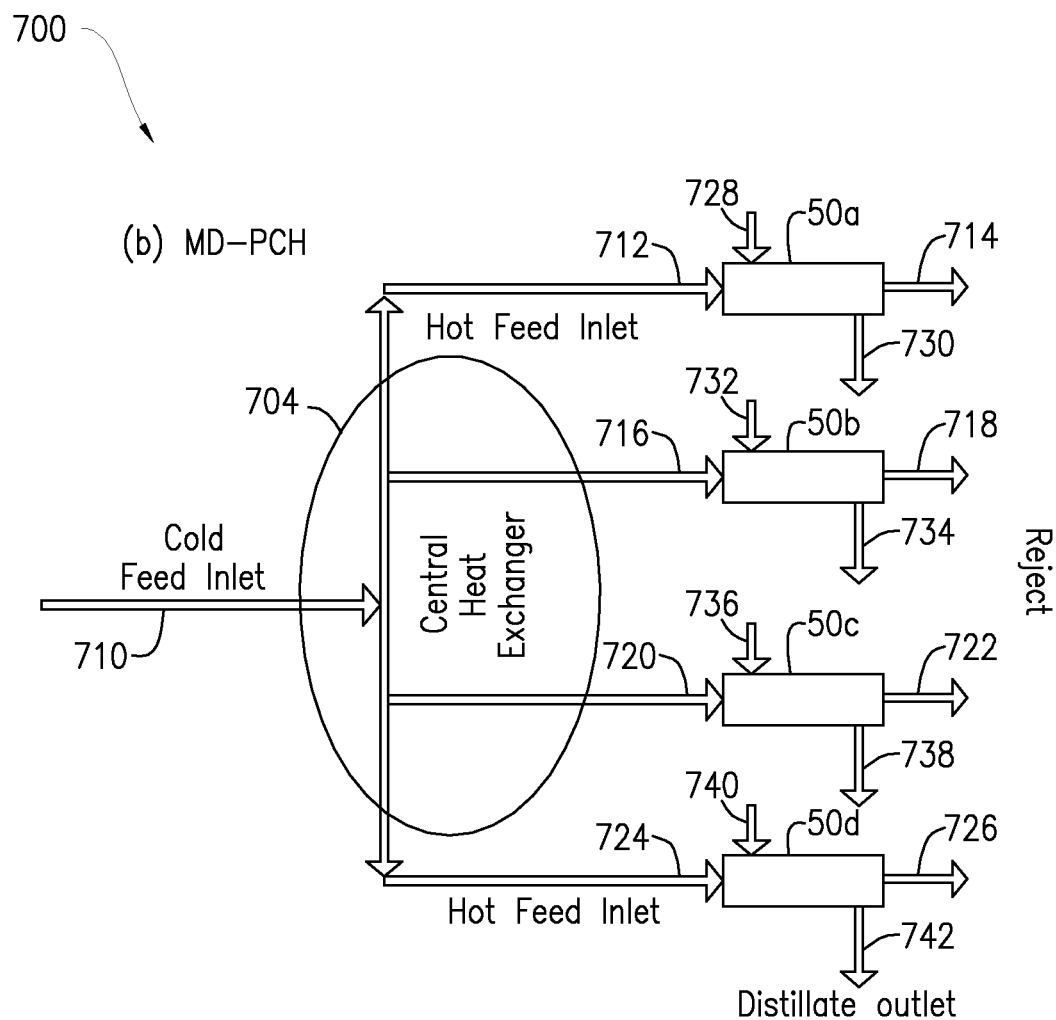
FIG. 11 is a schematic depiction of a multi-modular MD system with membrane modules in parallel and a central heat exchanger (MD-PCH) in accordance with one or more embodiments of the present invention.

Now referring to FIGS. 10 and 11, in further embodiments modular MD systems are equipped with a central heat exchanger for modules in series (FIG. 10)(MD-SHCH) and in parallel (FIG. 11) (MD-PCH).

With reference to FIG. 10, a system 600 includes a central heat exchanger 604 and MD modules 50a-50d arranged in series. Feed stream 610 is heated in the central heat exchanger 604 resulting in hot feed 612, which is introduced into MD module 50a. Stream 614 exiting MD module 50a is heated using central heat exchanger 604 and introduced to MD module 50b. Stream 618 exiting MD module 50b is heated using central heat exchanger 604 and introduced to MD module 50c. Stream 624 exiting MD module 50c is heated using central heat exchanger 604 and introduced to MD module 50d. Stream 628 exits MD module 50d. Thus streams exiting the feed outlet from each MD module is passed through the central heat exchanger 604 to reheat the exiting stream prior to the stream passing to the next MD module. Condensing media or distillate streams 630, 634, 638 and 642 are introduced to MD modules 50a, 50b, 50c and 50d, respectively, and condensing media or distillate streams 632, 636, 640 and 644 exit MD modules 50a, 50b, 50c and 50d, respectively. It will be apparent to the skilled artisan that while the embodiment shown includes four MD modules, the number of MD modules may be greater than or less than four, and the appropriate number of condensing or cold distillate streams may be employed to accommodate each of the MD modules.

Now referring to FIG. 11, system 700 includes a central heat exchanger 704 and a plurality of MD modules 50a-d arranged in parallel. Cold feed 710 is heated in the central heat exchanger 704 and the heated feed is distributed to each of the MD modules 50a, 50b, 50c and 50d in separate feed streams 712, 716, 720 and 724, respectively. Streams 714, 718, 722 and 726 exit MD modules 50a, 50b, 50c and 50d, respectively. Condensing media or distillate streams 728, 732, 736 and 740 are introduced to MD modules 50a, 50b, 50c and 50d, respectively, and condensing media or distillate streams 730, 734, 738 and 742 exit MD modules 50a, 50b, 50c and 50d, respectively. It will be apparent to the skilled artisan that while the embodiment shown includes four MD modules, the number of modules may be greater than or less than four, and the appropriate number of condensing or cold distillate streams may be employed to accommodate each of the MD modules.

Membrane Distillation Modules with High Heat Capacity and In Situ Heating

In a typical MD system, the temperature gradient between hot feed side and the cold distillate side provides the driving force for the MD process. The latent heat of evaporation of the water vapor that passes through the membrane pores is supplied by the heat from the hot feed. It is thus important to maintain a high temperature gradient throughout the module to obtain a higher water vapor permeation rate. The feed water entering the module is usually at a high temperature but as the water moves forward, the heat loss due to evaporation reduces the temperature of the feed. As a result, the MD flux decreases significantly.

In accordance with embodiments herein, devices and methods are disclosed that help to maintain temperature uniformly in the feed side to maintain a high temperature gradient throughout the module, and enhance membrane flux.

Figure 12:
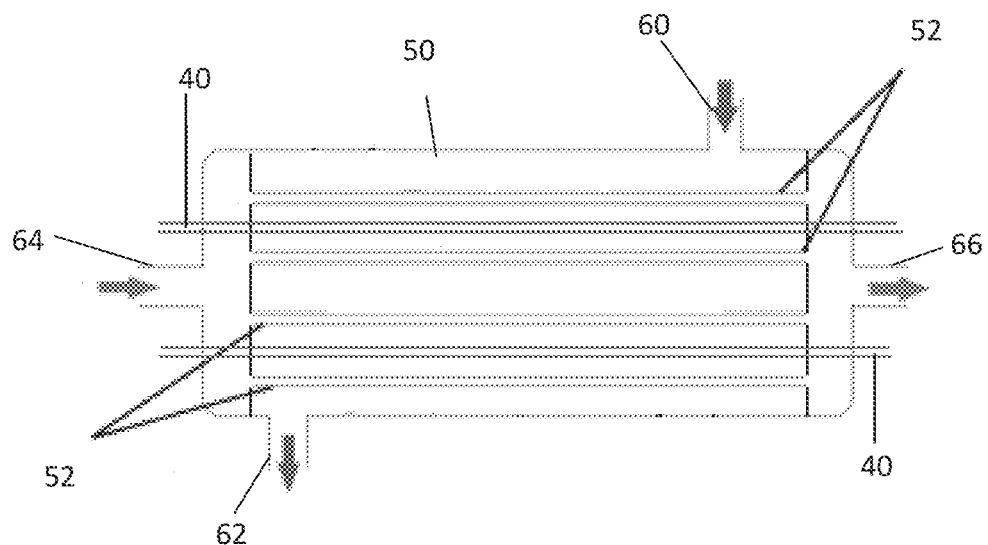
FIG. 12 is a schematic depiction of a membrane module equipped with steam lines in accordance with one or more embodiments of the present invention.

Now referring to FIG. 12, in accordance with a further embodiment, a MD module 50 having membranes 52, feed inlet 60, feed outlet 62, condensing media inlet 64 and condensing media outlet 66 is disclosed with heating elements 40 positioned in the MD module 50. The heating elements 40 may provide additional heat to increase the temperature of the feed that drops due to evaporation. The MD modules equipped with heating elements 40 may be used in the systems and methods disclosed herein, either to provide the heat required to heat a feed entering an MD module or as an additional heat source. The MD modules equipped with heating elements 40 may be used with or without fillers or packing materials. Some examples of such fillers or packing materials are ceramic beads, silica, metal and metal oxide beads, graphite fibers, carbon black. These materials absorb the heat from the feed water at the initial stage, and are able to supply additional heat to maintain the temperature at a constant level as soon as it reaches equilibrium. These materials also provide turbulence to the feed flow that reduces the temperature polarization, hence enhancing water vapor flux. Additional heating provided to the membrane module also allows the fillers to be heated up to provide a high temperature gradient across the membrane.

The heat may be provided through various means, such as but not limited to via steam, electric heating elements or via microwave heating. Additionally, it will be apparent to those skilled in the art that the novel disclosed membrane modules may be equipped with a single heating element 40 or multiple heating elements.

Figure 13:
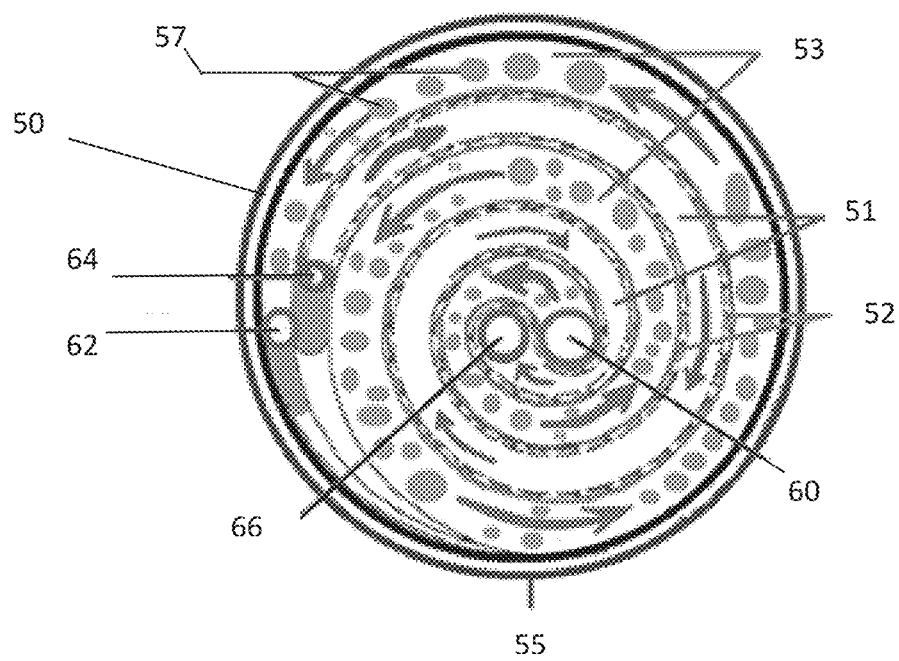
FIG. 13 is a cross-sectional schematic view of a spiral wound membrane module equipped with a baffle/spacer and steam jacket in accordance with one or more embodiments of the present invention.

Now referring to FIG. 13, in an exemplary embodiment a spiral wound membrane module 50 is shown. The membrane module 50 includes membranes 52, hot feed inlet 60, hot feed outlet 62, distillate or condensing media inlet 64, distillate or condensing media outlet 66, hot feed channel 53, and distillate or condensing media feed channel 51. The hot feed flow channel 53 in this embodiment includes a baffle/spacer 57 and may be filled with the filler materials described above. Additionally, the membrane module is equipped with an external steam jacket 55 that supplies additional heat to the hot feed.

The novel membrane modules as described herein may be employed in connection with any of the systems disclosed herein, as well as in other MD systems.

Although the devices, systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All publications, patent applications, patents, figures and other references mentioned herein are expressly incorporated by reference in their entirety.

What is claimed is:

1. A membrane distillation (MD) system comprising at least two MD modules arranged in series, each of the at least two MD modules comprising at least one membrane, a condensing media inlet or a surface operable to receive a condensate and a condensing media outlet, a feed inlet operable to receive a feed media and a feed outlet, and at least one external heating element positioned and operable to heat the feed media to a first temperature prior to introduction of the feed media to a first of the at least two MD modules, and to heat a stream exiting the feed outlet of the first of the at least two MD modules to at least a higher temperature prior to the stream being introduced to a second of the at least two MD modules, wherein the at least one external heating element and the condensing media or a surface are operable to maintain a high temperature gradient between feed media entering and permeate in the at least two MD modules, and
   wherein temperature on a feed side of the at least two MD modules is maintained at a high value to enhance membrane flux and water recovery by increasing temperature of the stream exiting the feed outlet of each of the at least two MD modules to a higher temperature.

2. The MD system of claim 1 comprising more than two MD modules.

3. The MD system of claim 1 further comprising a second external heating element positioned and operable to heat the stream exiting the first of the at least two MD modules to at least the first temperature.

4. The MD system of claim 1 comprising more than two MD modules arranged serially and plural external heating elements in addition to the at least one external heating element, wherein each of the plural external heating elements is positioned and operable to heat a stream exiting each of the more than two MD modules to a high temperature prior to the stream being introduced to a successive MD module.

5. The MD system of claim 1, wherein the at least one external heating element is a central heat exchanger positioned and operable to also heat the stream exiting the feed outlet of the first of the at least two MD modules to at least the first temperature.

6. The MD system of claim 1 comprising more than two MD modules, wherein the at least one external heating element is a central heat exchanger positioned and operable to also heat a stream exiting each of the more than two MD modules to at least the first temperature prior to the stream being introduced to a successive MD module.

7. The MD system of claim 1 wherein each of the MD modules is independently selected from the group consisting of a hollow fiber membrane module, a flat membrane module and a spiral wound membrane module.

8. The MD system of claim 1 wherein each of the MD modules is independently selected from the group consisting of a direct contact membrane distillation (DCMD) module, a sweep gas membrane distillation (SGMD) module, a vacuum membrane distillation (VMD) module and an air gap membrane distillation (AGMD) module.

9. The MD system of claim 1 wherein at least one of the at least two MD modules comprises at least one heating element positioned therein.

10. The MD system of claim 1 wherein at least one of the at least two MD modules comprises a spiral wound membrane module or a hollow fiber module.

11. A method for purifying a feed stream comprising the steps of providing a plurality of MD modules arranged in series, circulating a condensing media through each of the plurality of MD modules, heating the feed stream to a first temperature prior to introduction of the feed stream to the first of the plurality of MD modules using at least one external heating element, subsequently heating each stream exiting each MD module to a higher temperature using the at least one external heating element prior to introducing each stream to a successive MD module, maintaining a high temperature gradient between feed stream entering and permeate of the at least two MD modules, and maintaining temperature on a feed side of the at least two MD modules to enhance membrane flux by increasing temperature of the stream exiting the feed outlet of each of the at least two MD modules to the first temperature.

12. The method of claim 11 wherein at least one of the plurality of MD modules comprises at least one heating element positioned therein.

13. The method of claim 11 wherein at least one of the plurality of MD modules comprises a spiral wound membrane module comprising at least one baffle positioned in the hot feed channel and an external steam jacket.

14. The method of claim 11 wherein each of the plurality of MD modules is independently selected from the group consisting of a hollow fiber membrane module, a flat membrane module and a spiral wound membrane module.

15. The method of claim 11 wherein each of the plurality of MD modules is independently selected from the group consisting of a direct contact membrane distillation (DCMD) module, a sweep gas membrane distillation (SGMD) module, a vacuum membrane distillation (VMD) module and an air gap membrane distillation (AGMD) module.

16. A membrane distillation (MD) system comprising at least two MD modules arranged in series, each of the at least two MD modules comprising at least one membrane, a condensing media inlet operable to receive a condensing media and a condensing media outlet, a feed inlet operable to receive a feed media and a feed outlet, and at least one external heating element positioned and operable to heat the feed media to a first temperature prior to introduction of the feed media to a first of the at least two MD modules, and to heat a stream exiting the feed outlet of the first of the at least two MD modules to at least the first temperature prior to the stream being introduced to a second of the at least two MD modules, wherein the at least one external heating element and the condensing media are operable to maintain a consistent temperature gradient between feed media entering and exiting the at least two MD modules, and wherein temperature on a feed side of the at least two MD modules is maintained at a high value to enhance membrane flux and water recovery by increasing temperature of the stream exiting the feed outlet of each of the at least two MD modules to the first temperature.

* * * * *